May 22, 1934.  A. G. TAYLOR  1,959,450
BRAKE TESTING APPARATUS
Filed Dec. 2, 1930   2 Sheets-Sheet 2
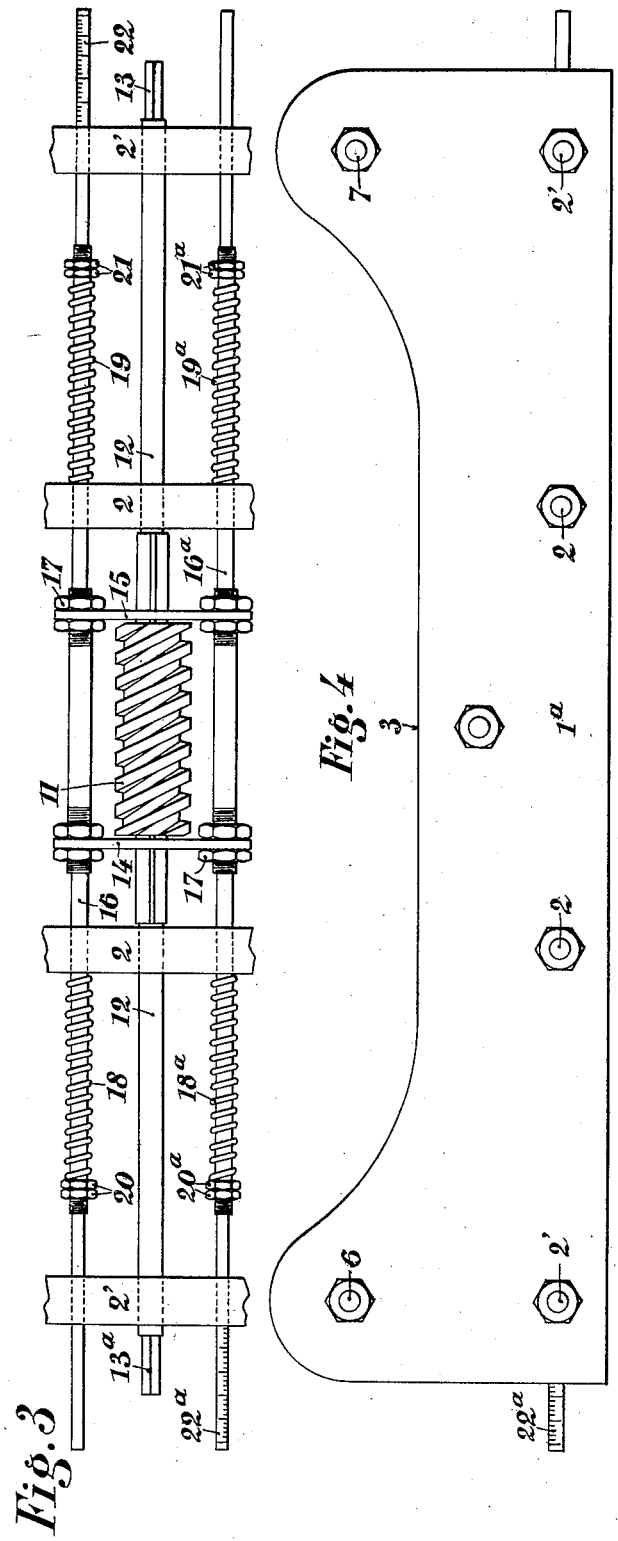
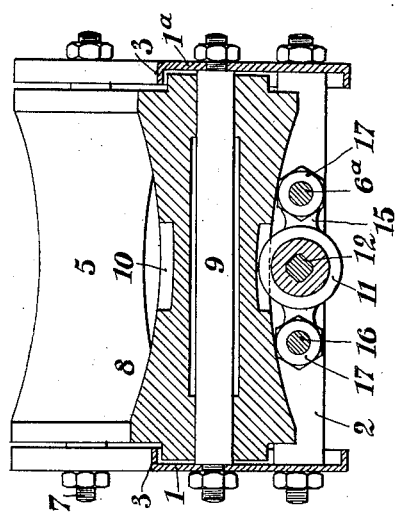
INVENTOR:
ARTHUR GEORGE TAYLOR
ATTORNEYS Patented May 22, 1934

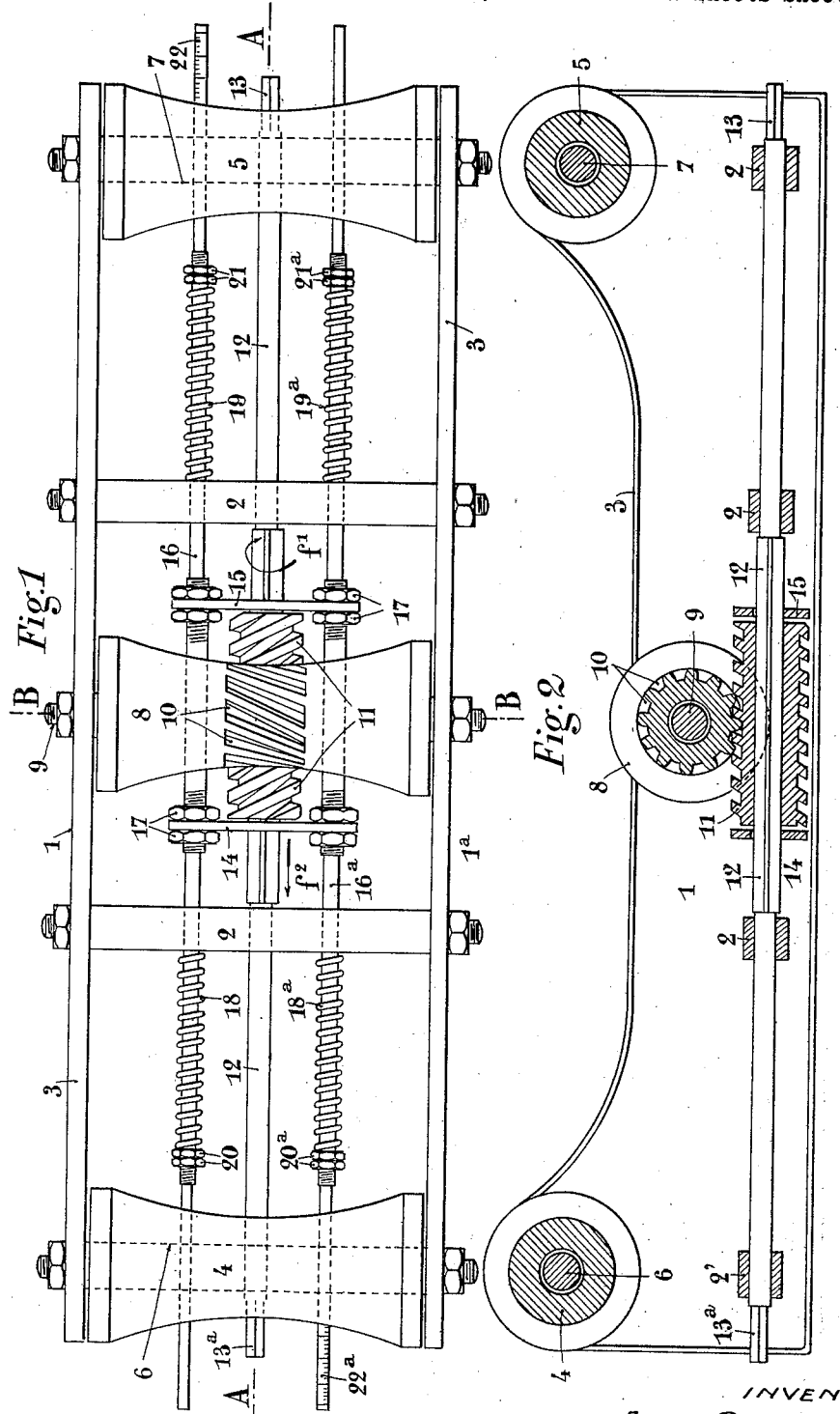

1,959,450

UNITED STATES PATENT OFFICE 1,959,450

BRAKE-TESTING APPARATUS

Arthur George Taylor, Paris, France, assignor of one-half to Maurice Wahiche, Paris, France Application December 2, 1930, Serial No. 499,461
In France December 12, 1929

2 Claims. (Cl. 265—25)

The invention relates to an apparatus adapted to test the brakes of motor vehicles and to provide for the adjustment of said brakes in a rational manner and in conditions which are quite identical with those of the normal operation of the brakes when the vehicle is running.

In the preferred embodiment of the invention, the apparatus comprises the following combination:

1. A cradle constituted by two side girders assembled by means of cross bars and between which are mounted a number of loose rollers and a central roller, also loose on its shaft, said central roller having a helical toothing meshing directly with a worm slidable axially along a control shaft and adapted to rotate in unison with the latter.

2. A frame (or casing) adapted to follow the axial movement of the worm and cooperating with a system of return springs, whose tension is adjustable and which are mutually balanced, said springs constantly urging the frame and the worm into a mean idle position.

3. Means for measuring or registering the amount of longitudinal displacements of the worm and frame.

The operation is based upon the following principle:

Due to the resistance which may be opposed to the rotation of the toothed-roller by the wheel of a vehicle resting on said roller, the worm and the part movable therewith will be imparted an axial displacement when the control shaft is rotated.

Such displacement is performed against the action of one set of return springs and the amount of such displacement gives the measure of the resistance opposed by the wheel, whether the latter is loose or braked by the braking arrangement on the vehicle.

It will also be understood that the apparatus according to the invention is more particularly useful in performing the simultaneous adjustment of the four wheels of the vehicle, the braking power being exactly the same for each wheel of the same axle, and assuming any desired relative value with respect to the wheels of the other axle.

In the accompanying drawings:

Fig. 1 is a diagrammatical top plan view of a first embodiment of the invention.

Fig. 2 is a longitudinal section on the line A—A of Fig. 1.

Fig. 3 shows in plan view the lower part of the apparatus, that is the worm, its moving frame and the control shaft.

Fig. 4 is a side elevational view.

Fig. 5 is a vertical cross-section along the line B—B of Fig. 1.

In the preferred embodiment of the invention, the apparatus comprises a frame constituted by two side-girders or plates 1 and 1a, preferably metallic and assembled by cross bars 2—2'.

The upper part of the side plates is cut out so as to form a cradle 3, whose length should be greater than the largest possible diameter of the vehicle wheels whose braking is to be tested.

Between the side plates and towards their ends, are mounted respective rollers 4 and 5, whose shafts are denoted by 6 and 7, while adjacent the middle of the cradle is a roller 8, whose shaft is denoted by 9. The shafts 6—7 and 9 also constitute spacing members for the side plates.

The shape of the rollers (Fig. 1) is a surface of revolution generated by the rotation, about the axes 6, 7 and 9, of circular arcs whose radius corresponds substantially to the average radius of the cross section of the pneumatic tyres which are provided on the vehicle wheels.

The end rollers 4 and 5 are loose on their shafts and said rollers have a smooth surface.

The central roller 8 is also loose on its shaft, but in the middle portion of this roller is cut a helical toothing 10, meshing with a worm 11, arranged below said roller and feathered upon a shaft 12, in such manner that worm 11 may slide axially along shaft 12 while rotating in unison with said shaft, which latter may be rotated by any suitable means (such as a rotary crank for operating a lifting jack, for example) engaging a squared end portion 13 or 13a of said shaft.

Worm 11 is engaged without any longitudinal clearance between two cross bars 14—15, slidably mounted on shaft 12 and assembled together by two longitudinal rods 16—16a, said cross bars being adjustably held in position along said rods by means of nuts 17 screwed on screwthreaded parts on rods 16—16a.

Said rods 16—16a are adapted to freely slide through cross-bars 2 and 2'.

Springs 18—18a and 19—19a are strung over said rods and bear at one end against the outer face of cross-bar 2 and at the other end upon nuts 20—20a and 21—21a; said springs are adapted to counteract, by pairs, the longitudinal displacements of said rods.

Suitable graduations 22—22a (either arbitrary or marked in kilograms or multiples of kilograms)

are traced at the end of the rods for measuring the amount of displacements of said rods by direct reading of the graduation adjacent an index member carried by a fixed part of the apparatus. Said index member, for example, may be constituted by the edge of cross-bar 2.

It will be seen that the arrangement comprising the springs and the frame 14, 15, 16, 16a constitutes a dynamometric arrangement.

The operation will be readily understood by the following considerations:

The apparatus being idle, that is without any load; and resting upon the rollers, the frame 14—15—16 and 16a under the action of the springs, assumes a mean position of equilibrium along shaft 12.

If by means of the squared end 13 or 13a, said shaft is rotated in either direction, worm 11, meshing with the gear teeth 10 of roller 8, drives the latter in rotation.

Except for the internal resistances, the resistance opposed by the roller 8 to the rotation of warm 11 is zero, so that the worm held by the springs does not move appreciably along the shaft 12.

By means of the nuts 20—20a and 21—21a, the tension of the springs is so adjusted as to be exactly equal on each side of roller 10.

If a vehicle wheel is caused to rest on a roller 8 and on one of rollers 4—5, and shaft 12 is rotated in either direction, roller 8, due to the frictional contact with the vehicle wheel, rotates the latter, the gear teeth formed thereon, increasing the frictional effect. It is obvious that the braking effect is proportional to the weight of the wheel and to the portion of the weight of the vehicle which is supported by said wheel.

This gives rise to a resistance which is transmitted to worm 11, whereby the latter will be screwed along pinion 10 and will be shifted to the left (arrow f2), if the direction of rotation is that shown by the arrow f1. The frame 14, 15, 16, 16a is moved together with worm 11, thus progressively tensioning the springs 19, 19a, while springs 18, 18a will expand (if they were initially tensioned) until the resistance opposed by said springs exactly balances the resistance opposed by the vehicle wheel to the rotation of roller 8.

At this instant, the system is in equilibrium, that is, if the operator still rotates shaft 12, worm 11 nevertheless remains stationary along said shaft (although it still rotates therewith), and, through the medium of roller 8, said worm rotates the vehicle wheel.

In order to adjust the brakes of the vehicle, the operation is as follows:

The rear wheels of the vehicle are laid upon two testing apparatus indentical with that above described, or better, the four wheels of the vehicle are laid upon four such apparatus.

Beginning preferably with the rear axle, shaft 12 of one of the apparatus is rotated, for example by means of a jack actuating crank, while leaving the brake pedal released.

Since two rear wheels of the vehicle rest on the driving rollers 8, it may be assumed that the weight of the corresponding axle is equally distributed between both apparatus.

As soon as the worm drives the driving roller, the vehicle wheel exercises a reaction which is directly proportional to the weight supported thereby and worm 11 is moved together with frame 14—15—16—16a and then becomes stationary along the shaft, one pair of springs being imparted a certain tension.

The operator reads on the scale 22 or 22a a certain number which measures the sum of the weight of the wheel resting upon the apparatus plus the fraction of the weight of the vehicle supported by said wheel.

It has been found that the optimum braking effect for the wheels of a given axle corresponds to an amount of friction equivalent to the amount of friction which would be generated by a weight equal to twice the weight supported with the brake released. Otherwise stated, suppose that the dynamometric arrangement indicates a force P with the brake released; in order to perform the adjustment, the brake pedal is depressed and the adjusting nuts of the brake gear are so adjusted that the dynamometer stops at the graduation 2P when shaft 12 is rotated. It is altogether indispensable that the brake pedal should be locked during the whole operation.

If the reading on the dynamometer is less than 2P the braking action is insufficient, while it is too powerful if the reading is more than 2P.

The operator then, according to the usual methods proceeds with the adjustment of the braking arrangement so that the reading be 2P.

The same adjustment is effected with the other rear wheel by rotating the shaft 12 of the corresponding apparatus until the same number, that is 2P, is obtained.

When proceeding with the adjustment of the brakes for the front wheels, it is observed that with the brakes released, the dynamometer shows a greater deviation than in the case of a rear wheel, and the reading is for example P'>P. This is due to the fact that the load upon the front axle is greater than upon the rear axle. The brake will therefore be so adjusted that the reading be 2P'. This difference of reading caused by a difference of load involves the obtainment of the braking of the front wheels prior to the braking of the rear wheels, since the operator must screw on the adjusting nuts on the rods of the brake gear to a greater extent, in order to attain the desired reading.

It will be seen that the operation is very simple and does not require any special skill from the operator.

When the apparatus is relieved from the weight of the wheels, the springs expand and bring the frame and the worm to their idle position, whereby the zero of the scales comes back in front of the index members.

By means of the control operations above described, it is possible to give to the braking arrangement the optimum position for the four wheels.

The operation is very easy and the apparatus may be readily placed under the wheels in the vertical plane of said wheels, which is very advantageous when the vehicle is not readily accessible from the side. Furthermore, the vehicle wheel is quite stable on the apparatus since it is supported by roller 8 and one or the other of the auxiliary loose rollers 4 or 5.

Obviously, the invention is by no means limited to the embodiment above described and represented which has been selected only by way of example. Thus, the number of rollers keyed to their shafts or loose rollers may obviously be any suitable one.

Having now described my invention, what I claim as new and desire to secure by Letters Patent is:

1. A brake testing apparatus comprising two spaced side plates, cross-bars for assembling said side plates, loose rollers arranged in a circle between said side plates, one roller having a helical toothing, a longitudinal shaft rotatable in said cross-bars, a worm slidably feathered on said shaft and meshing with said helical toothing, thrust plates bearing against said worm and slidable on said shaft, rods parallel with said shaft, rigid with said frame and extending through said cross-bars, springs surrounding said rods outwardly of said cross-bars and bearing against said cross-bars, adjustable nuts screwed on said rods for tensioning said springs and means for indicating the axial position of said frame.

2. In a brake testing apparatus as claimed in claim 1, a scale traced on one at least of said rods and a stationary index member cooperating with said scale.

ARTHUR GEORGE TAYLOR.